May 19, 1953     I. A. GETTING     2,639,424
RADIO PULSE ECHO OBJECT LOCATING SYSTEM
Filed Aug. 30, 1945
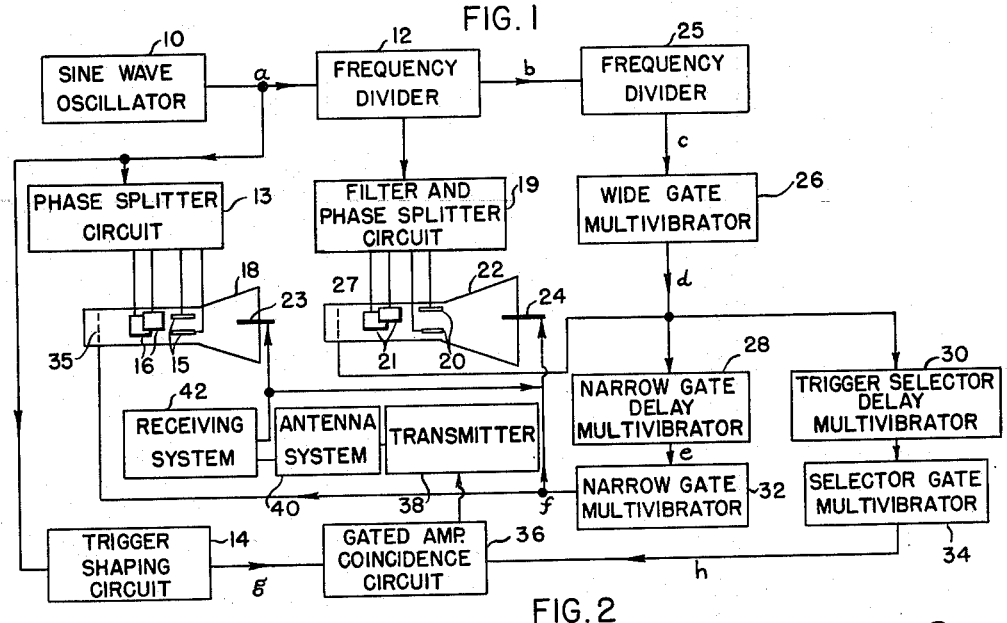
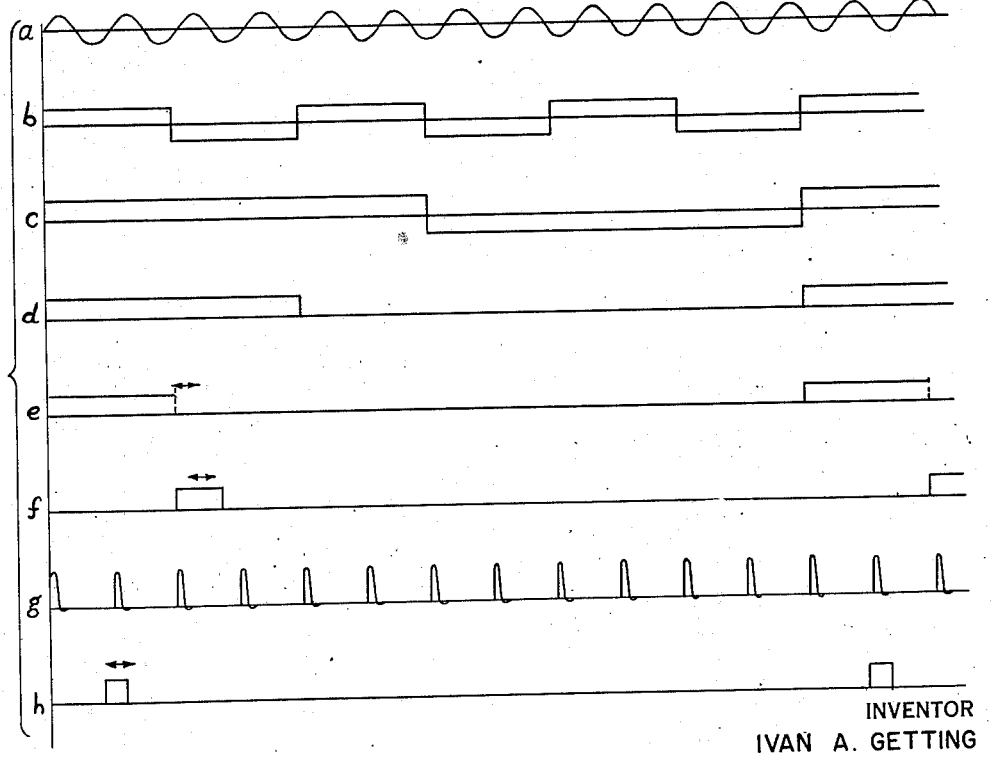
INVENTOR
IVAN A. GETTING
BY
*William D. Hall,*
ATTORNEY Patented May 19, 1953

2,639,424

UNITED STATES PATENT OFFICE 2,639,424

RADIO PULSE ECHO OBJECT LOCATING SYSTEM

Ivan A. Getting, Belmont, Mass., assignor, by mesne assignments, to the United States of America as represented by the Secretary of War Application August 30, 1945, Serial No. 613,608

7 Claims. (Cl. 343—11)

This invention relates generally to electrical circuits and more particularly to a circuit for accurately synchronizing the indicator presentations of a radio object locating system.

In one type of radio object locating apparatus, pulses of electromagnetic energy are transmitted and echo pulses are returned to the apparatus by reflecting objects in the vicinity after a time interval the duration of which is a measure of the range of the object from the transmitter. The length of this time interval may be measured by means of a cathode ray tube indicator, the beam of which is given a range sweep or periodic displacement, either linear or circular, in synchronism with the transmitted pulses of the system. Echo pulses are utilized to give a second momentary displacement to the electron beam in a direction perpendicular to the first displacement so that the position of this second displacement or pip gives an indication of the range of the target. In one such system a circular range sweep of the type referred to above is produced by two A. C. voltages 90° out of phase, one of which is applied to each of two perpendicular sets of deflection plates. This causes the electron beam to travel in a circular path with a period equal to that of the A. C. deflection voltage.

A modification of such a range indicator system consists of providing two range indicators, one having a range sweep of a period such that it includes the full range of the system, and a second having a range sweep of some smaller period so that it includes only a limited portion of the entire range in one sweep. In this way the second indicator presents an expanded portion of the entire range sweep of the first indicator and thus acts as a vernier to accurately determine the range of a selected target. It is obvious that both the slow and fast sweeps must be synchronized with the transmitted pulse so that echoes from a given target will appear at or near the same point on successive sweeps. One method of synchronization makes use of frequency division in such a way that the A. C. voltage used to generate the fast sweep is applied to a frequency divider and the resulting frequency, which is an integral submultiple of the first frequency, is used to generate the slow sweep. Either this second frequency or a third frequency obtained from the second by further frequency division is then used to produce triggers for the transmitter. This method of synchronization presents difficulties in that its adjustment is extremely critical and it is difficult to obtain accurate frequency division. It is therefore an object of this invention to provide means of accurately synchronizing a double-sweep range indicator and trigger generator circuit.

Further objects, features, and advantages of this invention will suggest themselves to those skilled in the art and will become apparent from the following description of the invention taken in connection with the accompanying drawing in which:

Fig. 1 is a block diagram of a preferred form of the invention; and

Fig. 2a–h is a series of waveforms which represent the voltages present at various points in the block diagram of Fig. 1.

Reference is now made more particularly to Fig. 1 showing a self-synchronous indicator and trigger generator system. The output of a crystal controlled sine wave oscillator 10 is applied to a frequency divider 12, phase splitter circuit 13, and trigger shaping circuit 14. Frequency divider 12 may consist of a multivibrator, the circuit constants of which are so chosen that the natural period of the multivibrator is approximately equal to or slightly greater than that of the desired output frequency. The input sine wave may then be applied as a synchronizing voltage to cause the actual period of the multivibrator to be some exact multiple of that of the input.

Phase splitter circuit 13 may consist of a resistance-capacitance circuit or any other means capable of producing a 90° phase shift. A portion of the sine wave voltage may then be applied to it and the resulting shifted voltage taken in conjunction with the original unshifted voltage will be suitable for producing a circular indicator sweep such as described above.

Trigger shaping circuit 14 may consist of an overdriven vacuum tube amplifier, the square wave output of which is applied to a resistance-capacitance peaker circuit to produce trigger pulses or any other circuit capable of achieving the same result.

The output voltages of phase splitter circuit 13 are applied to the vertical and horizontal deflecting plates 15 and 16 respectively of fast sweep indicator 18 to cause a circular motion of the electron beam. The output of frequency divider 12 is applied to filter and phase splitter circuit 19, the phase splitter portion of which may be the same as phase splitter circuit 13. The filter portion of circuit 19 may be merely a resonant circuit tuned to the fundamental frequency component of the square wave output from frequency divider 12. The voltages produced by filter and phase splitter circuit 19 are applied as sweep voltages to the vertical and horizontal deflecting plates 20 and 21 respectively of slow sweep indicator 22. Fast sweep indicator 18 and slow sweep indicator 22 are so constructed that they have central deflecting anodes 23 and 24 respectively in the centers of the screens of the tubes. When voltages are applied to these anodes the electron beams will be deflected radially.

The square wave output of frequency divider 12 is also applied to a similar frequency divider 25, which differs from frequency divider 12 only in that its natural period is approximately some multiple of the period of the latter. The output of frequency divider 25 is applied through a peaker circuit to wide gate multivibrator 26 which is so designed that it produces periodic rectangular voltage pulses of the approximate duration of one cycle of the slow sweep voltage. The peaker circuit mentioned may be included either as a part of the output circuit of frequency divider 25 or as a part of the input circuit of multivibrator 26. Multivibrator 26 is of the start-stop or one-shot type requiring a trigger pulse for normal operation.

The output pulse from multivibrator 26 is applied as an intensifier gate to the control grid 27 of slow sweep indicator 22 and is also applied through peaker circuits included as described above as a trigger to narrow gate delay multivibrator 28 and trigger selector delay multivibrator 30. These latter multivibrators are also of the start-stop type as are narrow gate multivibrator 32 and selector gate multivibrator 34, to which the outputs of multivibrators 28 and 30 are respectively applied through peaker circuits as above. Narrow gate multivibrator 32 produces a positive gate pulse which is applied to the control 35 of fast sweep indicator 18 and to the central deflecting electrode 24 of slow sweep indicator 22. The gate pulses from selector gate multivibrator 34 are applied to gated amplifier coincidence circuit 36. This circuit may consist of a vacuum tube amplifier so designed that it will amplify trigger pulses which are applied to it from trigger shaping circuit 14 only when a gate pulse from selector gate multivibrator 34 is simultaneously present on one of its grids. The selected trigger from coincidence circuit 36 is then applied as a trigger pulse to the transmitter 38 of the radio object locating system, while echo pulses from antenna system 40 through receiving system 42 are applied to central deflecting electrodes 23 and 24 of indicators 18 and 22 respectively.

Reference is now made to the waveforms of Fig. 2 for an explanation of the operation of the circuit of Fig. 1. The sine wave output of oscillator 10 is shown in Fig. 2a. When this voltage is applied as a synchronizing voltage to frequency divider 12, the resultant output from the latter circuit is as shown in Fig. 2b. It is obvious that the ratio of frequency division need not be as shown, the ratio of 1:4 being taken only as an example. The filter portion of circuit 19 is resonant at the fundamental frequency of the square waveform of Fig. 2b; hence, the higher component frequencies are filtered from this waveform, and the remaining sinusoidal component of the fundamental frequency is passed on to the phase splitter portion of circuit 19 and utilized as previously described in producing the slow sweep indication. The output waveform of frequency divider 25 is shown in 2c, the ratio of frequency division, taken as an example, in this case being 1:3.

Voltage waveform 2c after passing through a peaker circuit is used to initiate the cycle of operation of wide gate multivibrators 26, which in turn produces periodic pulses having the waveform of Fig. 2d. This latter wave or gate is applied as previously described to the control grid 27 of cathode ray tube indicator 22, which is so biased that a signal will appear on its screen only when this gate is present on its grid. Since the duration of the positive portion of this voltage is approximately equal to that of one cycle of the slow sweep voltage, only one of each three cycles of the slow sweep will appear on the slow sweep indicator, and this cycle will appear once for each transmitted pulse.

The initial portion of each pulse of the waveform of Fig. 2d is used to trigger delay multivibrators 28 and 30, the output waveform of multivibrator 28 being represented in Fig. 2e. The output waveform of multivibrator 30 is similar to that of multivibrator 28, having the same repetition frequency, but not necessarily the same pulse duration. These multivibrators are so designed that by varying the bias on one of the tubes the duration of the positive portion of the output voltage may be changed. This variation may be done independently in the two multivibrators, and the terminations of the two output voltage pulses are used to trigger multivibrators 32 and 34 respectively.

Narrow gate multivibrator 32 produces a narrow gate or voltage pulse which is initiated at the time that the voltage pulse from multivibrator 28 is terminated. This pulse, as shown in Fig. 2f, is of short duration which may be equal to or less than the duration of one cycle of the fast sweep voltage, the period of which may be seen in the waveform of Fig. 2a. As explained above, the time of occurrence of the narrow gate is determined by the duration of the pulse from narrow gate delay multivibrator 32, and this narrow gate may be caused to occur at any time within the wide gate pulse of Fig. 2d.

This narrow gate pulse is applied to the control grid 35 of fast sweep indicator 18, and again the bias is such that a trace appears on the screen of this indicator only when the gate pulse is present on its grid. With this arrangement a portion of a fast sweep cycle corresponding to any chosen portion of the slow sweep cycle may be caused to appear on the screen of the fast sweep indicator. This narrow gate is also applied as previously described to the central deflecting electrode 24 of slow sweep indicator 22 and causes a radial deflection of that portion of the slow sweep which appears on the fast sweep indicator.

The triggers produced by the trigger shaping circuit 14 are shown in Fig. 2g. A biased diode clipper may be used to eliminate the negative peaks and retain only the positive peaks shown in the figure. The trigger selector gate from multivibrator 34 is shown in Fig. 2h. Its time of occurrence may be varied in the same way as that of the narrow gate, so that it coincides with any suitable one of the trigger pulses of Fig. 2g. The trigger with which it coincides is then amplified by gated amplifier coincidence circuit 36, and passed on to the transmitter 38 to cause an R.—F. pulse to be transmitted by means of antenna system 40. Received pulses from antenna system 40 are amplified and detected in receiving system 42 and applied to central deflecting electrodes 23 and 24 of indicators 18 and 22.

Under some circumstances it might be desirable to make the repetition rate of the transmitted pulse the same as that of the slow sweep, in which case the second frequency divider could of course be eliminated. In the present embodiment of the invention, however, it has not been deemed necessary to make use of the full range made possible by the transmitted pulse repetition frequency, and hence only the nearest third of this range appears on the slow sweep range indicator.

While there has been described what is at present considered to be the preferred embodiment of this invention, it will be obvious to those skilled in the art that various changes and modifications may be made therein without departing from the scope of the invention as set forth in the appended claims.

The invention claimed is:

1. A radar system comprising a transmitter, a first indicating means, a second indicating means, generator means for producing a sinusoidal voltage, means connected to said generator means for utilizing said sinusoidal voltage in the production of a circular sweep on said first indicating means, trigger shaping means connected to said generator means for producing from said sinusoidal voltage a series of trigger pulses, first frequency division means connected to said generator means for producing from said sinusoidal voltage a second periodic voltage having a repetition frequency which is some submultiple of the frequency of said sinusoidal voltage, means connected to said frequency division means for producing from said second periodic voltage a circular sweep on said second indicating means, a second frequency division means connected to the output of said first frequency division means for producing from said second periodic voltage a third periodic voltage having a repetition frequency which is some submultiple of the repetition frequency of said second periodic voltage, means connected to the output of said second frequency division means for producing periodic gate voltage pulses to cause selected portions of said circular sweeps on said first and second indicating means to be visible, selector means for producing a periodic selector voltage pulse having the same repetition frequency as said gate voltage pulses and having a variable phase relation with respect thereto, and means connected both with said selector means and said trigger shaping means for amplifying any of said trigger pulses occurring simultaneously with one of said selector voltage pulses and for impressing said amplified trigger pulses on said transmitter to pulse said transmitter.

2. A radar system comprising a transmitter, two cathode ray tube indicators, means for producing a sinusoidal voltage, means connected to said generator means for utilizing said sinusoidal voltage to produce a deflection of an electron beam in each of said two cathode ray tube indicators, means for generating periodic gate voltage pulses for producing visible indications during a selected portion of the deflection of each of said electron beams, trigger shaping means connected to said generator means for producing from said sinusoidal voltage a series of trigger pulses, selector means for producing a periodic selector voltage pulse having the same repetition frequency as said gate voltage pulses and having a variable phase relationship with respect thereto, and means connected both with said selector means and said trigger shaping means for amplifying any of said trigger pulses occurring simultaneously with one of said selector pulses and for impressing said amplified trigger pulses on said transmitter for pulsing said transmitter.

3. The radar system described in claim 2 including means connected to said selector means for adjustably delaying the selector voltage pulses.

4. A radar system comprising a transmitter, two cathode ray tube indicators, means for producing a sinusoidal voltage, means connected to said generator means for utilizing said sinusoidal voltage to sweep the electron beam in each of said cathode ray tube indicators at different velocities, means for generating periodic gate voltage pulses, means for delaying said gate voltage pulses and impressing them on said indicators for producing visible indications of selected portions of the sweeps of the electronic beams, trigger pulse means for producing from said sinusoidal voltage a series of trigger pulses, selector means for producing periodic selector voltage pulses having the same repetition frequency as said gate voltage pulses and having a variable phase relationship with respect thereto, and means connected both with said selector means and said trigger pulse means for selecting any of said trigger pulses occurring simultaneously with one of said selector pulses and for impressing said selected trigger pulses on said transmitter for pulsing said transmitter.

5. The apparatus described in claim 4 in which said selector means includes a variable delay circuit for varying the time of occurrence of said selector voltage pulses.

6. A radar system comprising a transmitter, two cathode ray tube indicators, means for producing a periodic circular deflection of an electron beam in each of said two cathode ray tube indicators, said electron beam normally having an intensity insufficient to produce visible indications, means for generating periodic gate voltage pulses having a duration no longer than a deflection period, means for intensity modulating said electron beam with said gate pulses for producing visible indications during a selected portion of the deflection period of each of said electron beams, means for generating selector voltage pulses, means for variably delaying said selector voltage pulses with respect to said gate voltage pulses, means for producing a series of trigger pulses, means responsive to said selector voltage pulses and said trigger pulses for pulsing said transmitter at a predetermined interval after initiation of each of said periodic gate pulses.

7. The apparatus described in claim 6 wherein said means for generating said periodic gate pulses includes a variable delay circuit.

IVAN A. GETTING.

References Cited in the file of this patent

UNITED STATES PATENTS

| Number | Name | Date |
|---|---|---|
| 2,355,363 | Christaldi | Aug. 8, 1944 |
| 2,403,626 | Wolff et al. | July 9, 1946 |
| 2,405,238 | Seeley | Aug. 6, 1946 |
| 2,408,415 | Donaldson | Oct. 1, 1946 |
| 2,471,408 | Busignies | May 31, 1949 |
| 2,493,097 | Wolff | Jan. 3, 1950 |
| 2,497,165 | Goldberg et al. | Feb. 14, 1950 |
| 2,520,989 | Wilkerson | Sept. 5, 1950 |

FOREIGN PATENTS

| Number | Country | Date |
|---|---|---|
| 552,072 | Great Britain | Mar. 22, 1943 |